A. STEWART.
WORM DRIVEN FOUR-WHEEL DRIVE TRACTOR.
APPLICATION FILED MAR. 3, 1919.
1,398,578.
Patented Nov. 29, 1921.
4 SHEETS—SHEET 1.
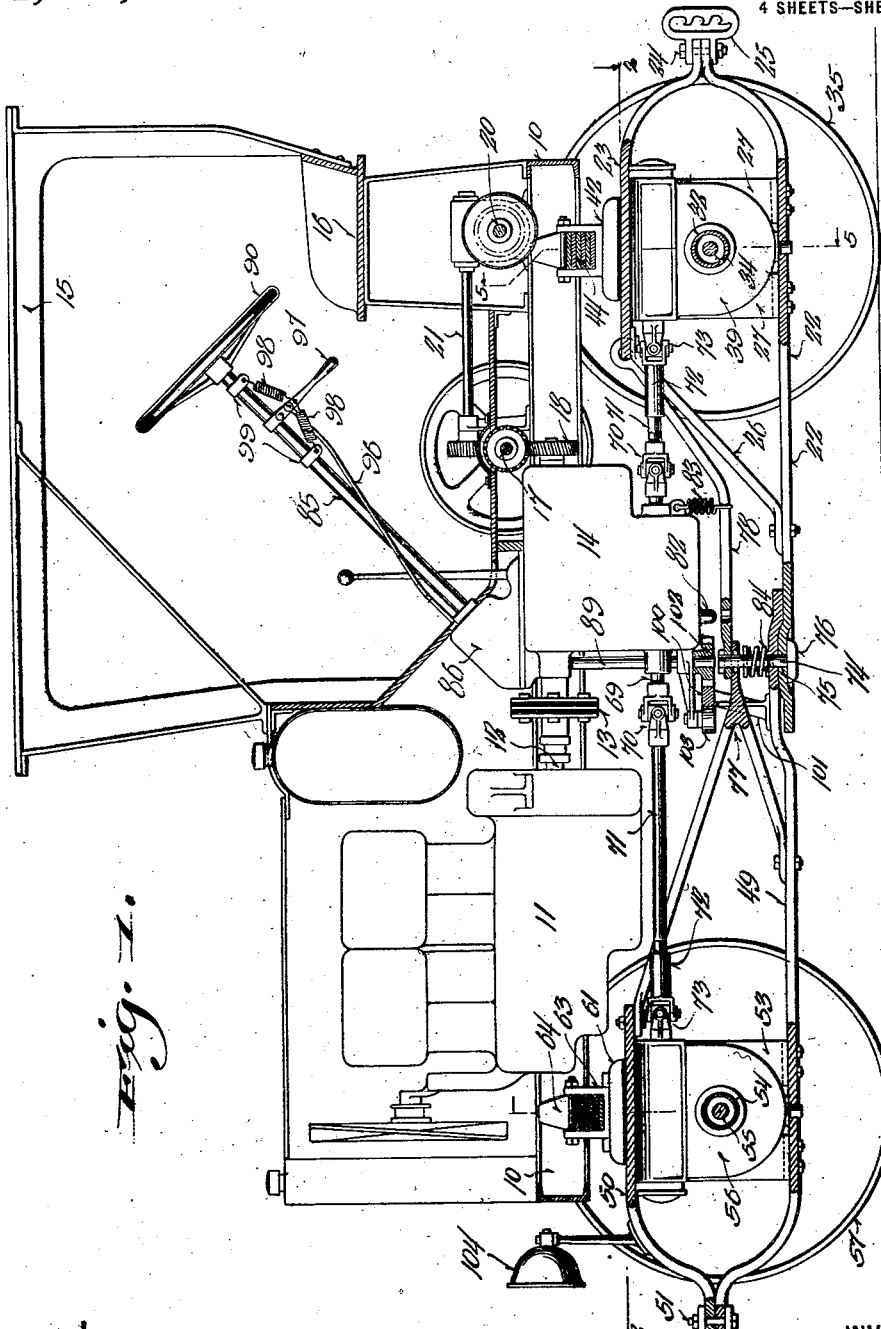
WITNESSES:
INVENTOR
Alexander Stewart
BY
ATTORNEY

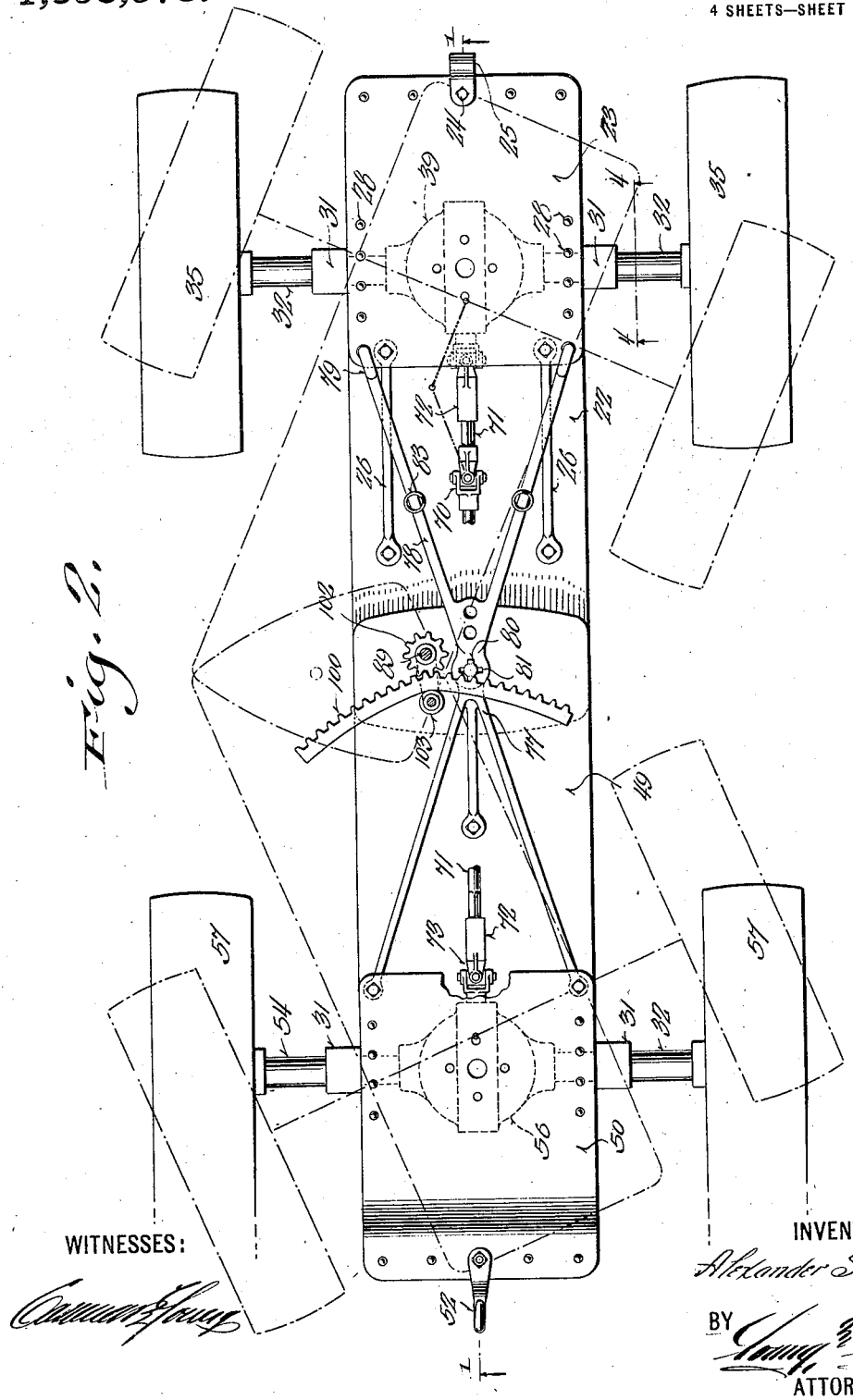

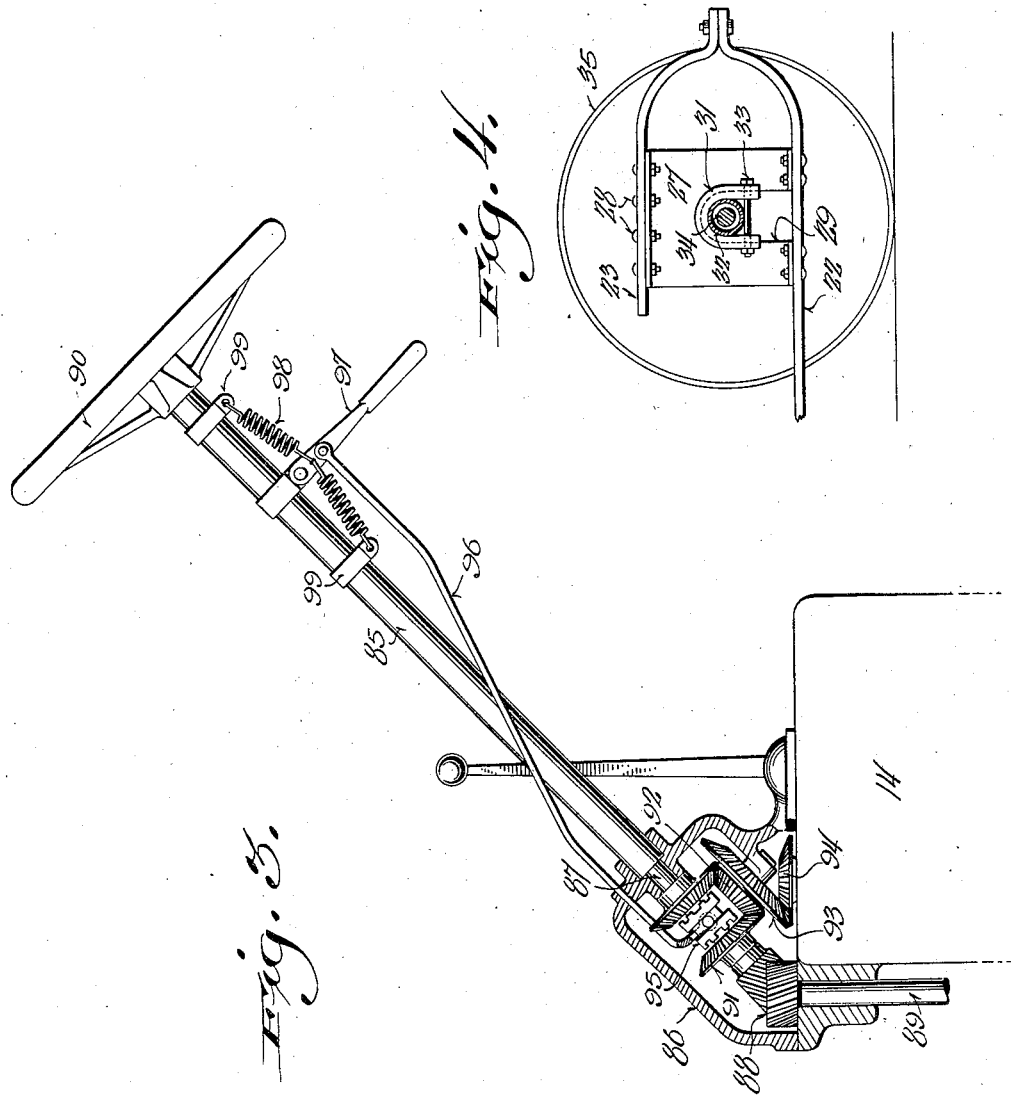

A. STEWART.
WORM DRIVEN FOUR-WHEEL DRIVE TRACTOR.
APPLICATION FILED MAR. 3, 1919.
1,398,578.
Patented Nov. 29, 1921.
4 SHEETS—SHEET 4.
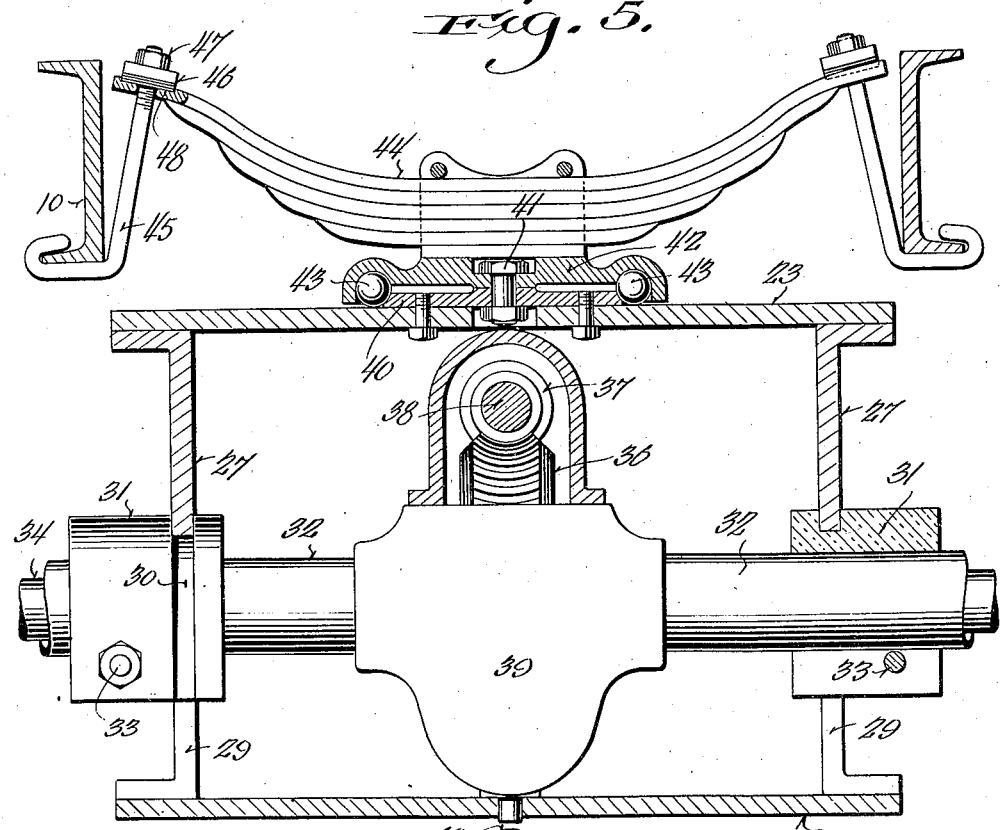
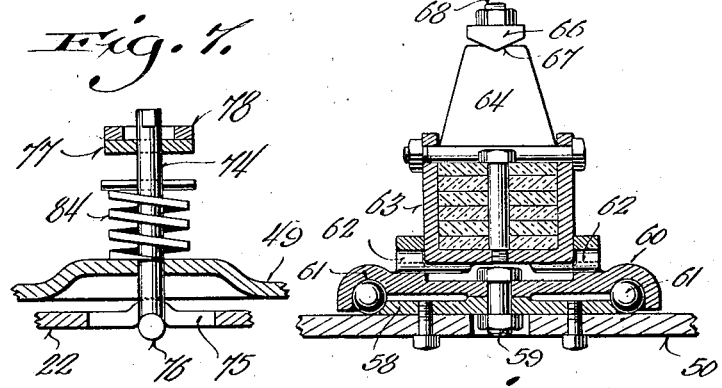
WITNESSES:
INVENTOR
Alexander Stewart
BY 
ATTORNEY

UNITED STATES PATENT OFFICE.

ALEXANDER STEWART, OF CLINTONVILLE, WISCONSIN.

WORM-DRIVEN FOUR-WHEEL-DRIVE TRACTOR.

1,398,578. Specification of Letters Patent. Patented Nov. 29, 1921.

Application filed March 3, 1919. Serial No. 280,268.

*To all whom it may concern:*

Be it known that I, ALEXANDER STEWART, a citizen of the United States, and resident of Clintonville, in the county of Waupaca and State of Wisconsin, have invented certain new and useful Improvements in Worm-Driven Four-Wheel-Drive Tractors; and I do hereby declare that the following is a full, clear, and exact description thereof.

My invention relates to new and useful improvements in motor-driven vehicles, more particularly of the farm tractor type and wherein all of the wheels are driven and adapted for steering movement.

It is in general the object of my invention to simplify and otherwise improve the structure and to increase the efficiency of machines of this character.

More particularly, it is my object to provide a direct worm drive for the wheels of the vehicle, embodied in an arrangement permitting free steering movement of the wheels.

A further important object resides in the provision of an arrangement whereby all of the wheels may be simultaneously operated in steering movement, or wherein the rear wheels may be locked against steering movement upon such movement of the front wheels, to meet different travel conditions encountered.

A still further object resides in the provision of an arrangement whereby a free pivotal connection is afforded between the various wheel units and the main frame, to compensate for relative movements of the wheel units in steering, and to permit relative yielding to compensate for road conditions.

With the above and other objects and advantages in view, which will be apparent as the description proceeds, my invention resides in the novel features of construction, combination and arrangement of parts as hereinafter more particularly described and defined by the appended claims.

In the accompanying drawings:

Figure 1 is a vertical sectional view through a tractor embodying my invention, the plane of this section being indicated by the line 1—1 of Fig. 2.

Fig. 2 is a plan view of the steering gear and axle structure, on a plane indicated by the line 2—2 of Fig. 1.

Fig. 3 is a detail sectional view of the steering column drive mechanism.

Fig. 4 is a detail sectional view of the axle mounting on a plane indicated by the line 4—4 of Fig. 2.

Fig. 5 is a sectional view taken transversely through the rear portion of the vehicle on a plane indicated by the line 5—5 of Fig. 1.

Fig. 6 is a detail sectional view through the mounting of the front axle unit on a plane extending longitudinally of the vehicle.

Fig. 7 is a detail sectional view through the detachable pivot connection of the main frame.

Referring now more particularly to the accompanying drawings, there is provided a main or upper chassis frame 10, in the forward portion of which is mounted a conventionally shown engine 11, the shaft 12 of which is connected by the usual flexible coupling 13 with a transmission mechanism 14, also carried by the main chassis. A driver's cab 15 having a seat 16 is mounted on the rear portion of the chassis. The chassis also preferably mounts a counter shaft 17 which has gear connection 18 with the transmission mechanism and which carries a drive pulley 19 at the side of the chassis whereby power may be taken off for driving a threshing machine or other mechanism when the tractor is stationary. A windlass counter-shaft 20 is also preferably mounted on the rear end portion of the chassis, being driven by a shaft 21 having gear connection therewith and having gear connection with the power countershaft 17.

The front and rear axles of the vehicle have their respective ground wheels fixed thereon and these axles are carried by frames forming therewith, a pair of units pivotally connected with the main chassis and having detachable pivotal connection, means being provided for swinging both units in steering movement or for swinging one of the units when the detachable connection is inoperative.

Thus, the rear axle unit comprises a lower frame plate 22 which extends rearwardly from a point approximately midway of the vehicle and which has its rear end upwardly offset for engagement with the downwardly offset rear end of an upper frame plate 23, said offset ends of the plates being connected by a bolt 24 which also preferably mounts a draft coupling 25. The upper frame plate is relatively short and is connected with the forward portion of the lower frame plate 22 by diagonal braces 26. Side frame plates 27 are secured to the upper and lower frame plates by bolts 28 passed through said upper and lower plates and through the out-turned edge portions of the side plates, and said side plates are provided with vertical slots 29 open at the bottom of the plates, the portions of the plates bounding the slots being engageable in peripheral grooves 30 of saddle bearing blocks 31, which seat on the end portions of the rear axle housing 32, displacement of the blocks from the housings being prevented by bolts 33 passed through the lower portions of the blocks. Drive axle sections 34 are mounted in the housing and carry the rear wheels 35 fixedly on their outer ends, the inner ends of the shaft sections being connected with the usual differential mechanism, the master gear 36 of which in the present instance is in mesh with a drive worm 37 carried on a shaft 38 journaled in the differential housing 39.

For connecting the rear axle frame with the main chassis 10 in such manner as to permit relative rotation of the rear axle unit, and also inward tilting movement of said unit for a purpose later to be set forth, a plate 40 is secured on the upper frame plate 23 and carries a pivot bolt 41 on which is mounted the base plate of a spring bracket 42, a series of ball bearings 43 being disposed in mating raceways formed in the said base plate and the plate 40. A series of upwardly bowed leaf springs 44 are secured in the bracket, extending transversely of the main chassis and terminating short of and adjacent the side rails thereof. The chassis is suspended from the uppermost of these leaf springs by a pair of hook bolts 45 having hook portions engaged about the lower flanges of the chassis side rails and having their upper portions passed through the ends of the leaf spring. A fulcrum block 46 is mounted on the upper end of the shank of each bolt 45, being retained by a nut 47 threaded on the upper end of the bolt, said fulcrum block having a beveled under face seating in a V-shaped recess 48 in the spring, thus permitting rocking movement of the entire rear wheel unit inwardly on said fulcrum blocks.

The front wheel unit is similar in many respects to the rear wheel unit described, comprising a lower frame plate 49 having its rear end extended to the central portion of the vehicle in overlapped relation to the end of the rear frame plate 22, and having its forward end upwardly offset for engagement with the downwardly offset end of an upper frame plate 50, said offset ends being connected by a bolt 51 which also mounts a draft hook 52. Side frame plates 53 are secured to the top and bottom frame plates and have mounted therein, similar to the rear axle structure, a drive axle housing 54 in which are disposed drive axle sections 55 extending from a differential 56 and fixedly carrying the front ground wheels 57.

For connecting the front wheel unit with the main chassis 10, a plate 58 is secured on the upper frame plate 50 and carries a pivot bolt 59 mounting a second plate 60, frictional contact of said plates being prevented by ball bearings 61 disposed in mating races formed in said plates. The upper plate 60 is provided with bearings for pintles 62 extending from the bottom of a bracket 63 mounting a series of upwardly bowed leaf springs 64 similar to the springs 44 of the rear axle unit, and the forward end of the chassis is suspended from these springs in the aforedescribed manner by fulcrum blocks 66 seating in recesses 67 in the end portions of the upper spring, and mounted on hook bolts 68 engaging the chassis.

The front axle unit is thus mounted for forward and rear tilting movement, for lateral tilting movement to compensate for irregularities of the ground over which it travels and for rotary steering movement.

The differential mechanisms of the front and rear axle units are driven in whatever relation said units may assume with respect to the transmission mechanism 14 by shaft sections 69 extending forwardly and rearwardly from the transmission mechanism and having universal connections 70 with shaft sections 71 which are squared for telescopic engagement in hollow shaft sections 72 connected in turn by universal connections 73 with the worm shafts of the differential mechanisms.

To procure, in my present structure, the detachable pivot connection of the front and rear axle units, a pivot bolt 74 is provided, which is passed through a transversely elongated slot 75 in the forward end of the rear frame plate 22 and which is passed through the lapped rear end portion of the forward frame plate 49, said bolt having a cross head 76 on its lower end adapted to pass through the slot 75 of the plate 22 and to engage against the bottom of the plate 49. This bolt is also passed through a brace 77 having forwardly branched portions secured to the forward frame plates 49 and 50, and the pivot bolt is further passed through the forward end of a yoke bar 78 having its legs pivotally connected at 79 with the forward edge portion of the rear frame plate 23. Lateral lugs 80 are formed on the upper end of the pivot bolt to retain the yoke bar 78 against displacement from the bolt, and said lugs are adapted to register with slots 81 in the yoke bar to permit detachment of the yoke bar from the pivot bolt when the head 76 of the bolt is in registry with the slot 75 to permit detachment of the rear frame plate 22 from the pivot bolt. Thus means is afforded for procuring complete detachment of the pivot bolt from the rear axle unit. When the rear axle unit is disengaged from the pivot bolt 74, it is locked against rotative movement relative to the main chassis by upward movement of the yoke bar 78 to procure interlocking engagement therewith of a lug 82 depending from the casing of the transmission mechanism 14. The yoke bar is resiliently urged upwardly by contractile coil springs 83 secured thereto and to the transmision casing, and the pivot bolt 74 is resiliently urged upwardly by a spring 84 coiled thereon and engaging against the forward frame plate 49 and against a stop on said bolt. Thus, when the pivot bolt is turned to aline its head 76 with the slot 75 of the rear frame plate 22, the rear axle unit will be automatically disengaged from the pivot bolt and locked against rotation relative to the main chassis. It may be at this point stated that while I have shown a specific detachable connection for the axle units, it will be appreciated that any detachable connection may be employed without departing in any manner from the spirit and scope of my invention.

For procuring steering movement of both of the axle units when they are connected, and for procuring steering movement of the front axle unit when disconnected, a steering column 85 extends obliquely upwardly and rearwardly from a casing 86 mounted on the forward portion of the casing of the transmission mechanism. A steering shaft 87 is disposed in this column and extended into the casing for worm drive connection 88 with a vertical shaft 89 extending to a point slightly above the plane of the upper end of the pivot bolt 74. A steering wheel 90 is mounted on the upper end of the steering column, and to provide when desired, a power drive for the steering shaft, a pair of beveled gears 91 are loosely mounted on the shaft within the casing 86 and mesh with a gear 92 which is connected with a gear 93 meshing in turn with a gear 94 driven from the transmision mechanism. A clutch member 95 is splined on the steering shaft for engagement with either of the beveled gears 91 which are thus continuously oppositely driven, and this clutch member is controlled by a rod 96 having spanner engagement therewith and extended outwardly of the casing 86 and along the steering column for connection with a handle lever 97. This handle lever is normally urged to a position wherein the clutch is neutral, by retractile coil springs 98 secured to the lever and extending in opposite direction for securement to attachment collars 99 on the steering column. Thus, by rocking the lever 97, the steering shaft may be driven in either direction of rotation, and said shaft is normally free for manual manipulation by the steering wheel 90.

An arcuate gear rack 100 is mounted on support arms 101 rising from the forward frame plate 29, and this gear rack is in mesh with a pinion 102 on the lower end of the shaft 89, it being held in such meshing engagement by a roller 103 engaging the forward edge of the rack and carried by a bracket arm extending forwardly from the transmission mechanism casing. Thus, when the wheel units have mutual pivotal connection, rotation of the roller 103 by the steering shaft will procure simultaneous pivotal steering movement of the wheel units, and when the pivotal connection of the units is disengaged, the front wheel unit will alone be actuated, it being noted that when both wheel units are actuated, said units rock inwardly at their main frame connections, this being freely permitted by the described structure of said connection.

While I have shown and described a preferred embodiment of my invention, it will be appreciated that various changes and modifications of structure may be employed to meet differing conditions of use, without departing in any manner from the spirit of my invention.

I preferably mount the lamps 104 of the vehicle on the upper frame plate 23 of the front axle unit, whereby said lamps will turn in steering movement of the vehicle, to direct their light in the path of travel.

What is claimed is:

1. A vehicle of the class described including a frame, front and rear axle units each pivotally connected with the frame, a disengageable mutual pivot connection for said axle units, means associated with one of the axle units for procuring pivotal movement thereof, and means for holding the other axle unit against pivotal movement with respect to the frame when the said mutual pivot connection of the units is disengaged.

2. A vehicle of the class described including a main frame, front and rear axle units each having a pivotal connection with the main frame, a common pivot bolt connecting adjacent inner portions of the axle units, and means associated with one of the axle units for procuring pivotal movement of both of the same, said pivotal connections being oscillatable longitudinally with respect to the main frame to accommodate the swinging movement of the common pivot.

3. A vehicle of the class described including a main frame, front and rear axle units each having pivotal tilting connection with the main frame, each of said units being independently tiltable with respect to each other and with respect to the frame, a common pivot bolt connecting adjacent inner portions of the axle units, and means for procuring simultaneous pivotal movement of the units when either one or both of the same is in tilted or in normal position, said pivotal connection being oscillatable with respect to the main frame to accommodate the swinging movement of the common pivot.

4. A vehicle of the class described including a main frame, front and rear axle units, each pivotally connected with the main frame and having an oscillatory pivotal connection with the main frame, each of said axle units including a wide frame plate extending inwardly of the vehicle, the inner ends of the plates being in lapped relation, a pivot bolt passed through the lapped inner portions of the plates, and means for procuring pivotal movement of the frame units.

5. A vehicle of the class described including a main frame, front and rear axle units having pivotal tilting connection with the main frame, a detachable pivot connection for said axle units, means for procuring relative pivotal movement of the axle units, and means for locking the rear axle unit to the main frame upon disengagement of the pivot connection of the axle units.

6. A vehicle of the class described including a main frame, front and rear axle units, a resilient supporting means pivotally connected with each of the axle units and having a longitudinally oscillatable connection with the main frame, a mutual pivotal connection for the axle units, and means for pivotally moving said axle units.

7. In a vehicle of the class described, the combination of a main frame, front and rear wheeled axle units having adjacent portions pivotally connected, a pair of springs each having its intermediate portion pivotally connected with one of said members, the end portions of each spring having a longitudinally swinging connection with the frame, and means for procuring pivotal movement of the axle units with respect to the springs.

8. A vehicle of the class described including a main frame, front and rear axle units including frames having mutual pivotal connection, and a transverse spring swiveled on each axle unit frame and having a link connection in supporting relation to the main frame whereby to accommodate lateral swinging movement of the mutual pivot.

9. A vehicle of the class described including a main frame, front and rear axle units including frames having a mutual pivotal connection, means for pivotally moving the axle units, a transverse spring carried by each axle unit frame, hanger bolts engaging the main frame and passed through the springs, and fulcrum blocks on said bolts seating on the springs, whereby to permit movement of the springs and axle units longitudinally of the frame upon pivotal movement of the latter.

10. A vehicle of the class described including a main frame, front and rear axle units each having pivotal longitudinally oscillatory connection with the main frame, each axle unit including a base frame plate extending inwardly of the vehicle, the inner end portions of the plates being in lapped relation, means connecting the lapped portions of said plates together, and means for procuring pivotal movement of the axle units.

11. A vehicle of the class described including a main frame, front and rear axle units, each axle unit comprising a pair of upper and lower frame plates connected together adjacent their outer ends, differential structure disposed between and secured to each pair of plates, resilient members pivotally connected to the upper plates, longitudinally oscillatory connections between the resilient members and the main frame, the lower plates being extended inwardly of the vehicle with their inner end portions lapped, means for pivotally connecting the inner lapped portions of the lower plates, and means for procuring pivotal movement of the axle units.

In testimony that I claim the foregoing I have hereunto set my hand at Milwaukee, in the county of Milwaukee, and State of Wisconsin.

ALEXANDER STEWART.